(Model.)
J. C. TAUBER.
STAIR TRUCK.
No. 255,693. Patented Mar. 28, 1882.
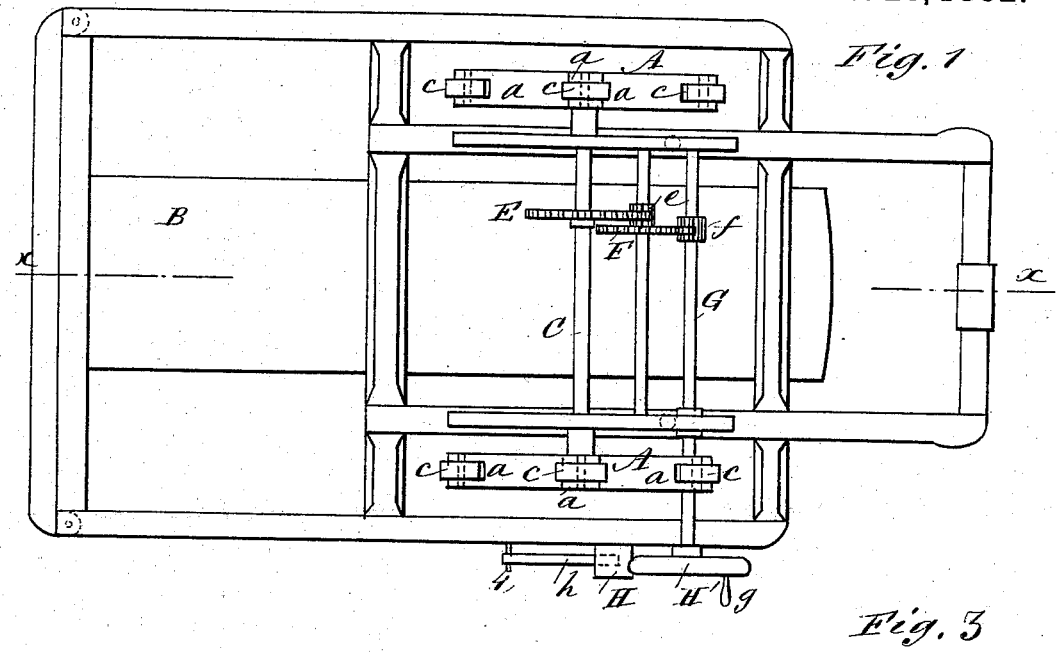
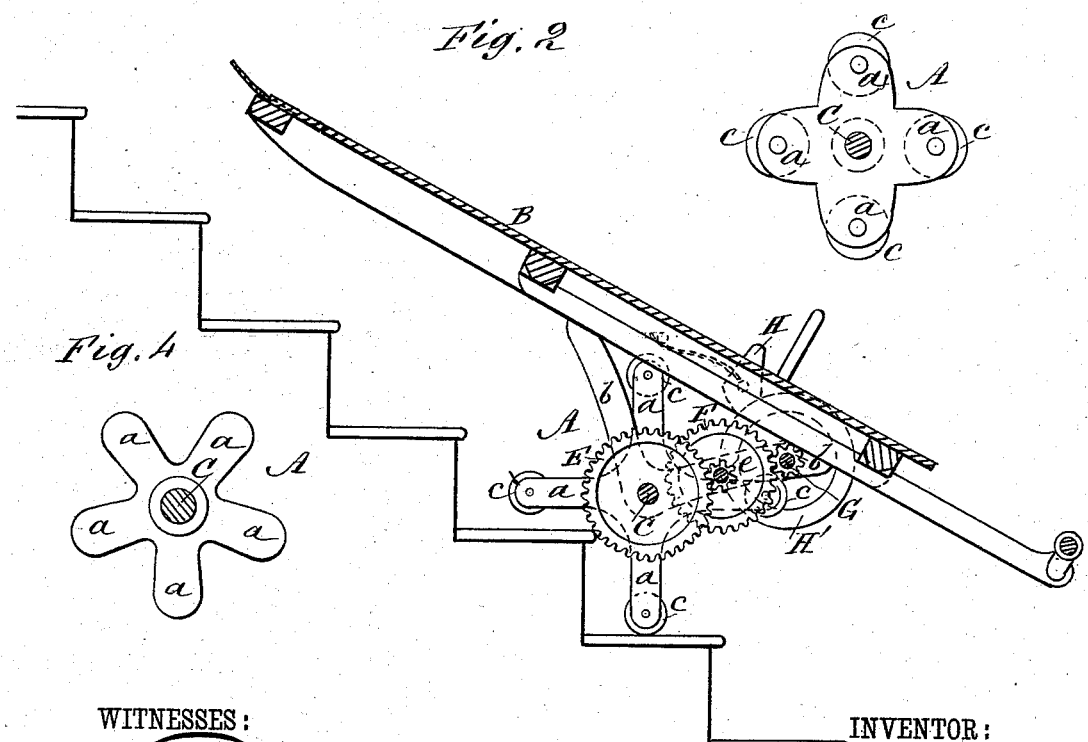
WITNESSES:
C. Neveux
C. Sedgwick
INVENTOR:
J. C. Tauber
BY Munn & Co.
ATTORNEYS.

UNITED STATES PATENT OFFICE.

JOHANN C. TAUBER, OF PLAIN CITY, OHIO.

STAIR-TRUCK.

SPECIFICATION forming part of Letters Patent No. 255,693, dated March 28, 1882.

Application filed August 15, 1881. (Model.)

*To all whom it may concern:*

Be it known that I, JOHANN C. TAUBER, of Plain City, in the county of Madison and State of Ohio, have invented a certain new and Improved Stair-Truck, of which the following is a specification.

The object of my invention is to provide a truck by means of which heavy burdens may be easily carried up or down stairways without danger of marring or in any manner injuring the stairs, casing, or banisters, and without the necessity of providing tracks, pulleys, or tackle of any kind.

The invention consists principally of a wheel provided with extensions or arms, said wheel being adapted to be revolved by any suitable gearing or other mechanism attached to the truck for elevating the truck and burden from stair to stair or lowering the same, as the case may be.

The invention also consists in the details of construction and the arrangement of parts, as hereinafter more fully described.

In the accompanying drawings, Figure 1 is a plan view of my improved truck. Fig. 2 is a section thereof, taken on the line $x\,x$ of Fig. 1; and Figs. 3 and 4 show modified forms of the wheel.

Similar letters of reference indicate corresponding parts.

In the drawings though only two forms of the wheel are shown, it is obvious that various other forms and equivalent constructions might be adopted, all involving the principle of my invention—as, for instance, instead of the form shown at A in Figs. 1 and 2, constructed with the four slender arms $a$, or the form shown in Fig. 3, with the four large arms, or the form shown in Fig. 4, constructed with five arms, a wheel constructed with a less number of arms—say three—or a greater number—as five, six, or even more—might be used; but I prefer to construct the wheel with four slender arms, as shown in Figs. 1 and 2, each arm being provided at its ends with the caster-wheels $c$; but these caster-wheels may be omitted, if desired. And though in the drawings two of the wheels A are shown attached to the ends of the axle, a single wheel attached to the center of the axle might be used instead of the two wheels with very good results; but I prefer the two wheels, as shown.

The wheels A A, which may be made of metal or wood, or both, are secured as above mentioned upon the axle C, journaled in the downward extensions $b\,b$ of the truck body or platform B. Near the center of the length of this axle is fixed the cog-wheel E, which meshes with the pinion $e$, formed upon the cog-wheel F, which latter wheel meshes with the cog-wheel or pinion $f$ upon the crank-shaft G. By means of this gearing, motion being imparted to the shaft G by means of the crank $g$, the wheels A A of the truck will be revolved and the arms of the wheels will reach from stair to stair, and cause the truck, with its load, to ascend the stairway, as illustrated in Fig. 2.

In descending the stairway with a load upon the truck, to hold the same from descending too rapidly I provide the side bar of the truck with the pivoted brake H, which bears against the crank-wheel H' upon the shaft G, which brake is held in contact with the wheel against the friction by means of the spring $h$, which comes against the pin $i$ in the side of the truck. When the truck and load are to be moved over a level surface the caster-wheels $c$ serve the same purpose as the wheels of an ordinary truck, permitting the truck and load to be easily moved.

Having thus fully described my invention, I claim as new and desire to secure by Letters Patent—

1. A stair-truck having a shaft, C, provided with radial arms $a$ at each end, and mechanism by which said shaft may be rotated, as described.

2. The armed wheels A, secured upon the axle C, in combination with the gear-wheels E F, and the pinions $e\,f$, and the crank-shaft G, substantially as and for the purposes set forth.

3. The stair-truck herein shown and described, consisting of the platform B, armed wheels A A, secured upon the shaft C, and the crank-shaft G, and the gear-wheels E and F, and the pinions $e$ and $f$, the side of the truck being provided with the brake H, substantially as described.

JOHANN C. TAUBER.

Witnesses:
CHARLES E. SWEETSER,
A. N. WOODRUFF.